July 27, 1937.                R. R. BLACK                 2,088,400
                            PIPE INSULATION
               Filed April 20, 1935            2 Sheets-Sheet 2
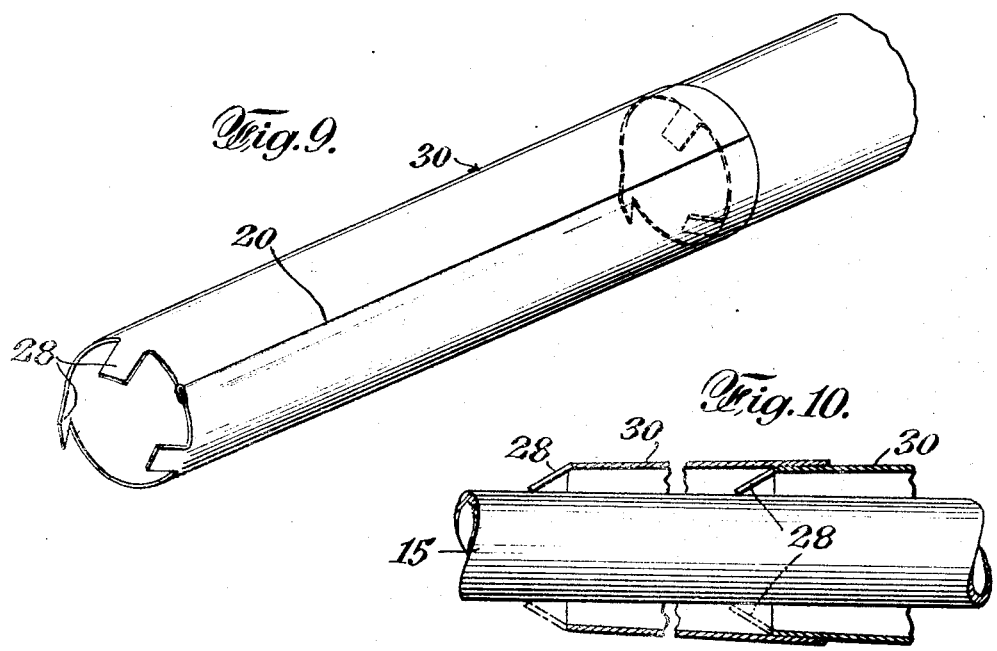
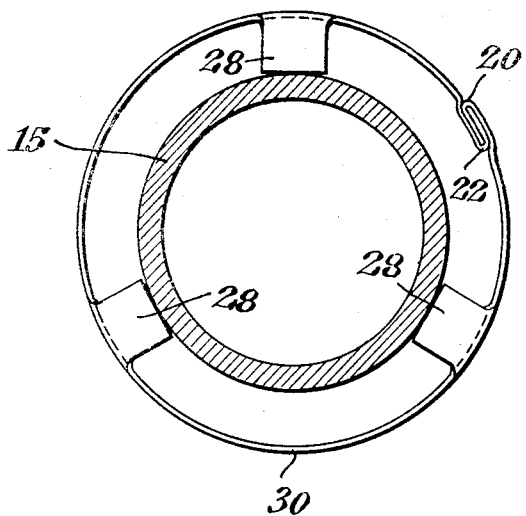
INVENTOR
Roe R. Black
BY John A. Bliss
ATTORNEY Patented July 27, 1937

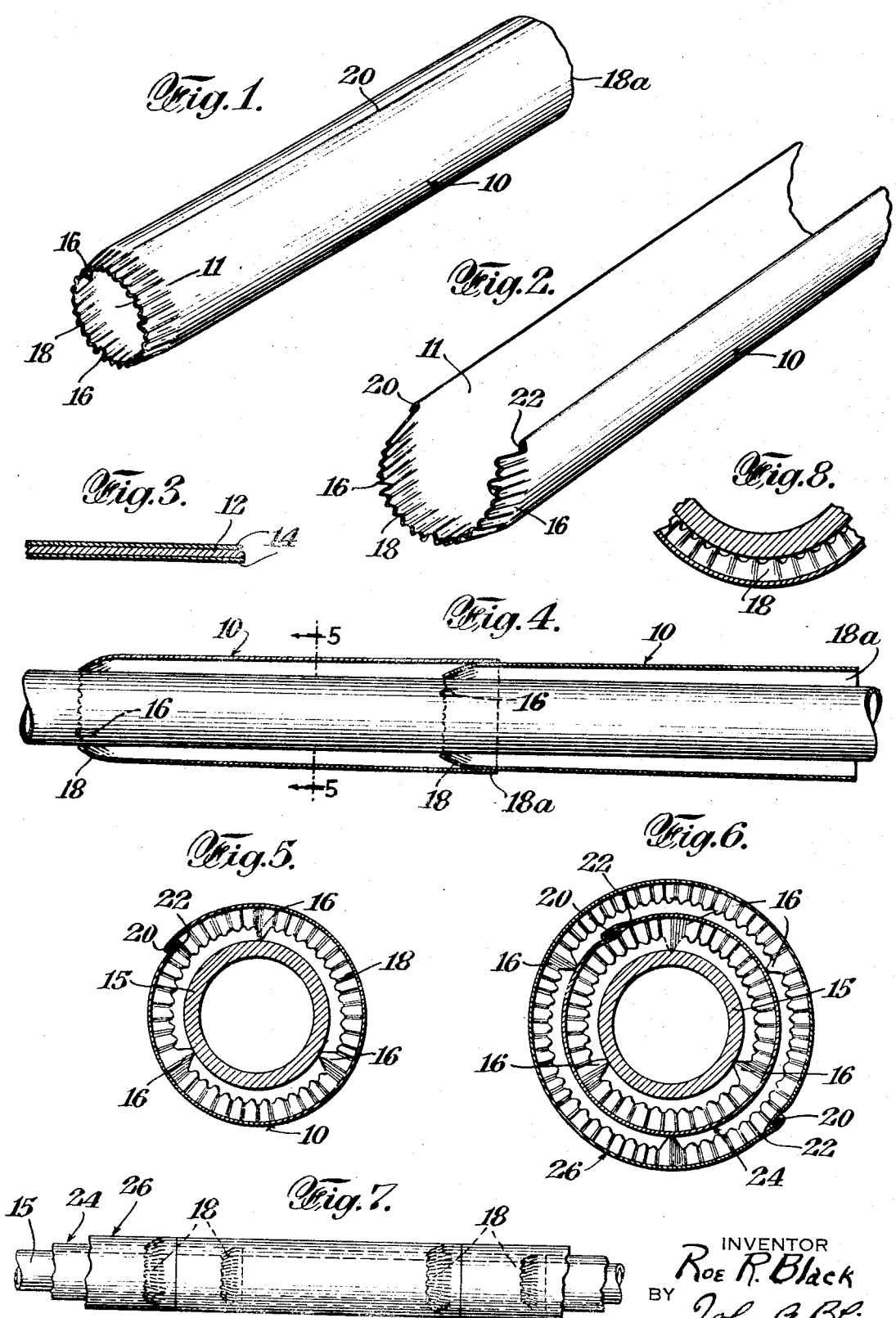

2,088,400

UNITED STATES PATENT OFFICE 2,088,400

PIPE INSULATION

Roe R. Black, Douglaston, N. Y., assignor to Reynolds Corporation, New York, N. Y., a corporation of Delaware Application April 20, 1935, Serial No. 17,372

6 Claims. (Cl. 154—45)

This invention relates generally to insulating pipe coverings formed of resilient, flexible sheet metal and particularly to such sheet metal pipe covering having integral therewith spacing and connective means for successive units of the same.

Heretofore, while there have been a plurality of pipe insulations, they have been subject to certain disadvantages. Some have been expensive to manufacture, or inconvenient to ship; others have been expensive and difficult to mount in place upon a pipe, or have been bulky and ugly. Some pipe coverings have had low insulation efficiency, have required frequent painting, and have rapidly deteriorated under practical working conditions, particularly where exposed to dampness and water. Most of the more efficient insulations are ruined if it is found necessary to remove them temporarily from any pipe upon which they are mounted.

To overcome the above difficulties, I have devised a simplified all-metal pipe covering formed of thin gage, flexible and resilient sheet metal, which is cheap and easy to manufacture and also cheap and easy to install on a pipe. Under practical working conditions it is long lived and may be readily dismounted from its pipe without injury. Such covering of sheet metal should have a bright reflective surface, at least upon its inner side, such surface being obtained either by the type of sheet metal which is employed or by some type of coating. The pipe covering is preferably formed in a U-shape and this permits nesting so that various units of the covering may be easily shipped. This is a decided advantage. Also because of the flexibility and resiliency of the metal when the U-shaped member is flexed into a generally tubular shape around a pipe, the inherent resilience of the metal may be utilized by some hooking means to hold the ends of the U together. In my preferred form I provide one crimped end on each unit of my pipe covering, which crimped end serves to connect the successive units when the same are placed upon the pipe so that all form a continuous whole. Also by indenting at spaced intervals inward projections in the crimped end I find that such projections form a sufficient resilient spacing means from the pipe, although I find that the crimped end alone if elongated may serve as efficient spacing means. The spaced projections allow fewer points of contact and therefore lower heat losses from conduction.

The sheet metal pipe covering will generally be formed of sheet steel tin-plated or bright metal plated, or covered with aluminum or other bright foil, and may be made of sheet aluminum, or, in fact, may be made of any metal having the requisite flexibility, resiliency and reflective qualities.

A particular advantage of my pipe covering in its preferred form, is that it tends to remain in fixed position upon a pipe due to opposing forces set up between the resilient spacers and the U-body of the covering itself. A further advantage is that the all-metal covering does not absorb moisture; thus it can be used inside or outside of a building and for underground conduits.

My invention can readily be understood from the accompanying drawings which are set forth merely for the purposes of illustration and are not to be deemed as limiting the scope of my invention.

In the drawings,

Fig. 1 is a perspective view of a pipe covering unit embodying my invention, showing the same flexed under tension into a generally tubular form;

Fig. 2 is a perspective view of this unit shown in Fig. 1 but shown without tension and in its normal generally U-shape;

Fig. 3 is a cross section of a pipe covering formed of sheet metal having an aluminum foil coating upon both its inner and outer surfaces;

Fig. 4 is a longitudinal cross section showing two units of pipe covering connected together and mounted in place upon a pipe;

Fig. 5 is a transverse cross section on the line 5—5 of Fig. 4;

Fig. 6 is a transverse cross section of a pipe having two pipe covering units mounted one over the other in order to obtain high insulation value;

Fig. 7 is a longitudinal cross section of two pipe coverings mounted one above the other;

Fig. 8 is a fragmentary cross section of a modification of my invention showing a crimped end alone serving as a spacing means;

Fig. 9 is a perspective view of a further modification of my invention showing different spacing means;

Fig. 10 is a fragmentary longitudinal cross section of the pipe covering shown in Fig. 9 applied to a pipe; and Fig. 11 is an end view of Fig. 10 with the parts in position on a pipe.

In these drawings, a unit or section 10 of pipe insulation covering or casing is formed in a generally U-shape. The pipe casing may be formed of any flexible resilient sheet metal with a bright surface, for example sheet aluminum 11, as indicated in Figs. 1 and 2, or as illustrated in the cross section in Fig. 3 the pipe casing may be formed of sheet steel 12 coated as shown with aluminum foil 14 on both sides, but foil on both sides is not necessary. The aluminum foil may be retained in place by any suitable adhesive. I have found that sheet steel when dipped into glues of a phenol-resin type dissolved in a volatile solvent, and allowed to dry, retain the foil very well when the latter is applied to the sheet steel with heat and pressure.

Each unit 10 of pipe covering preferably is formed in about three foot lengths so that the same may be easily shipped and handled; it will be noted that the U-shape shown in Fig. 2 will allow the nesting of these units so that the same occupy relatively little space in shipping.

The loss of heat by radiation is prevented by the bright metal surface of the pipe covering, the loss of heat by convection is prevented by the body of the covering itself, and the loss of heat by conduction is best prevented by spacing the pipe covering 10 away from a pipe 15 as clearly indicated in Fig. 5 by projections 16 which contact the pipe at widely separated points. The projections 16 preferably will be formed in a crimped end portion 18 of unit 10 and project inwardly of the covering to a greater extent than said crimped end portion 18 which will ordinarily be formed at one end of each unit. The crimped end portion 18 serves as a connective means to link the successive units 10 one to another and projections 16 seperate or space said successive units 10 from the pipes upon which the units are mounted. Also the crimped end portions 18 facilitate the easy overlapping of successive units 10 which latter will usually be separately mounted upon the pipe and connected by sliding any unit 10 along the pipe so that its crimped portion 18 enters the uncrimped end portion 18a of the adjacent unit. The crimped end portion 18 acts as an alignment means to center and connect successive units of the covering. Ordinarily, for good efficiency, the internal diameter of the pipe covering when in position should be approximately 1 inch greater than the external diameter of the pipe.

The projections 16 therefore are not strictly necessary and the crimping itself, if formed deep enough, can be used if desired to space the pipe covering from the pipe, as indicated in Fig. 8. One important feature of my invention is the provision of an efficient resilient spacing means integral with the pipe covering which contacts the pipe slightly, such spacing means being at an acute angle to the longitudinal axis of the pipe covering when the latter is in position. The acute angle of the spacing means allows its easy flexing when the casing is being positioned.

The U-shaped units at their longitudinal edges are provided with complementary and engageable hook shaped flanges 20 and 22 respectively, which interlock and which when interlocked will maintain the U-shaped member in a generally tubular shape under tension, the resiliency of the flexible U-shaped member maintaining the same in such shape. If the covering 10 is foil mounted, these hook shaped flanges 20 and 22 tend to hold the foil firmly in place and so resist any peeling tendencies.

By virtue of the end portion 18 being crimped and at an acute angle to the pipe covering, the crimped portion can be flexed outwardly when mounting the pipe covering and when interlocking the hook shaped flanges 20 together. Resiliency of both the crimped end 18 and the spacing means 16 allows the firm positioning of my pipe covering and both preferably should be arranged so that they are compressed slightly out of their normal position by the tension of the covering 10. When so arranged the compression forces of the spacing means will oppose the tension of the covering and the covering will be firmly positioned on the pipe by virtue of the opposite forces set up. Also the spacing means 16 must be sufficiently resilient and flexible since they normally will be bent outwardly beyond their normal position when upon the pipe during the operation of engaging the hook shaped flanges 20 and 22.

A section or unit 10 of the pipe covering may be positioned on a pipe in a relatively few seconds and thereupon another section may be flexed into position adjacent thereto but not touching the same, which latter section is then slid along the pipe until its crimped end 18 tightly fits into the uncrimped end 18a of the adjacent section as indicated in Fig. 4. By this means successive sections can be rapidly mounted in place upon a pipe and a large amount of pipe can be covered in a comparatively short time. The crimping allows the easy entry of the crimped end portion 18 into uncrimped end 18a so that the crimping serves both as an alignment means and a connective means. If desired, the sections 10 can be slightly tapered so that the narrow ends will telescope for a short distance; actually as indicated in Fig. 4 the thin gage metal sections will ordinarily telescope slightly without such tapering.

If desired, for added insulation efficiency, it is possible to mount two successive coverings 24 and 26 one above the other respectively, as indicated in Figs. 6 and 7. It is obvious that pipe covering so mounted can be rapidly taken down without harm or loss, simply by disengaging the sections and unhooking the flanges.

A modified form of spacing and connective means which I have found efficiently blanks out of sheet metal is shown in Figs. 9 and 10. In this form the spacing means comprises tabs 28 arranged in spaced relationship at one end of a unit or section 30 of pipe covering and at an acute angle to the horizontal axis thereof, as indicated in Fig. 9. These tabs 28 ordinarily touch the pipe only tangentially and should be relatively narrow in width so that they will be springy and resilient; it is the width of the members and their acute angle to the pipe covering which gives them their flexibility and which allows the pipe covering to be easily mounted in place upon a pipe. These tabs 28 in addition to spacing the pipe sections 30 from a pipe, also facilitate connection of one section of pipe to another particularly by forming an entering and aligning means for one section of a pipe and the adjacent section. The sections 30 may be joined by sliding one section along the pipe to the next section. In the type of unit or section shown in Fig. 9 one end, namely the end which carries tabs 28, is formed of a slightly narrower diameter than the other end of such section; this allows a tight union between successive sections of the pipe covering.

It is to be understood that while the illustrated forms of the invention which I have described represent certain preferred embodiments, I do not wish to limit myself precisely to these details, since it is obvious the same may be considerably varied without departing from the spirit of the invention as defined and claimed in the appended claims.

What I claim is—

1. An all-metal covering for a pipe comprising a plurality of units each formed of flexible resilient sheet metal provided with a bright surface, each unit comprising a covering member normally assuming a U-shape but adapted to be flexed to a generally tubular shape, means adapted to retain the same tubular when the same is in a tubular shape, means for spacing said covering member away from a pipe, and means for connecting successive units of the pipe covering, said spacing and connective means being integral with said covering member.

2. A structure as defined in claim 1 wherein said connective means comprise a crimped end portion of said covering member and wherein said spacing means comprise a plurality of spaced inward projections in said crimped end portion, said projections extending a greater distance inwardly of said covering member than said crimping.

3. A structure as defined in claim 1 in which said spacing means comprise flexible spring members adapted to contact with the pipe at relatively few points and formed at an angle to the longitudinal axis of said pipe covering when said pipe covering is in position.

4. A structure as defined in claim 1 in which said spacing means comprise flexible spring members adapted to contact with the pipe at relatively few points and formed at an angle to the longitudinal axis of said pipe covering when said pipe covering is in position, said spacing means being arranged so that when the pipe covering is in position the spacing means are bent under compressive forces and retain the covering in spaced relation with the pipe, the forces in said flexed spacing means being opposed to the tension of the U-shaped member when the latter is flexed into tubular shape, whereby the covering tends to remain in fixed position.

5. An elongated all-metallic covering unit for a pipe comprising flexible and resilient sheet material having a bright surface formed in a generally U-shaped cross section adapted to be flexed into a generally circular cross section, means adapted to maintain said unit in said circular cross section, flexible spacing means adapted for spacing the unit from a pipe so that an air space is formed therebetween, said spacing means being integral with said unit and being angularly disposed with respect to the horizontal axis of said unit, and alignment and connective means adapted to connect successive pipe covering units, said alignment and connective means being an inwardly crimped end portion of said unit.

6. In a pipe covering of flexible resilient sheet metal provided with a bright surface normally assuming a cross section of U-shape but adapted to be flexed into a generally circular cross section, means integral therewith adapted to hold the covering in a generally circular cross section and a flexible indented end portion disposed at an acute angle to the horizontal axis of the covering adapted to space the covering from a pipe, said indented end portion being also adapted to serve as an alignment means to align successive units of the covering.

ROE R. BLACK.